Figure 1:
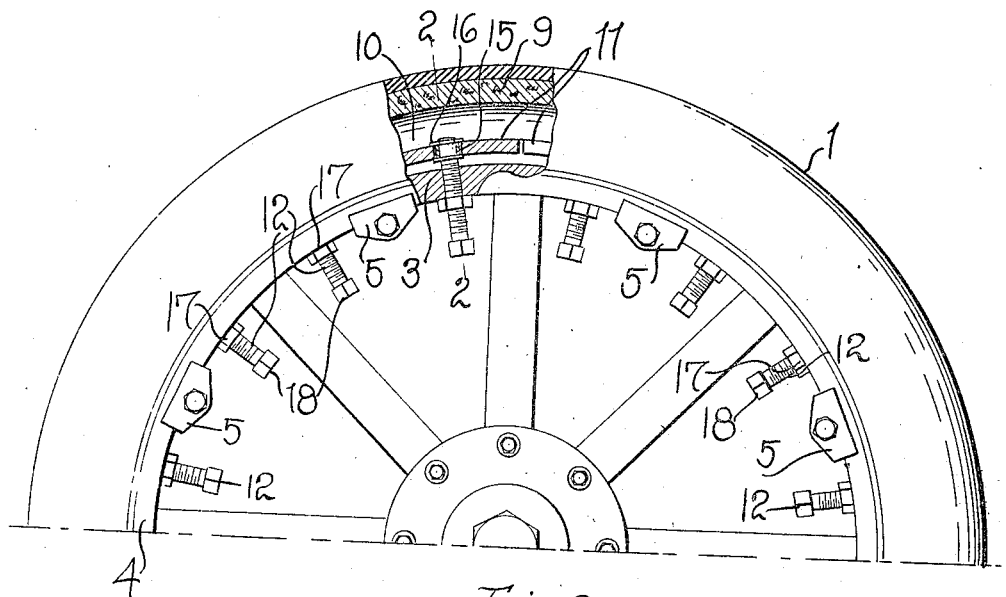

E. M. DEAL.
RESILIENT WHEEL.
APPLICATION FILED SEPT. 17, 1914.

1,179,508.

Patented Apr. 18, 1916.

Witnesses
Robert M. Sutphen
V. J. Lourick

Inventor
E. M. DEAL
By Watson E. Coleman
Attorney

UNITED STATES PATENT OFFICE.

ENAN M. DEAL, OF PHILADELPHIA, PENNSYLVANIA, ASSIGNOR TO JOHN JOSEPH BROOKS, OF PHILADELPHIA, PENNSYLVANIA.

RESILIENT WHEEL.

1,179,508.  Specification of Letters Patent.  Patented Apr. 18, 1916.

Application filed September 17, 1914. Serial No. 862,254.

*To all whom it may concern:*

Be it known that I, ENAN M. DEAL, a citizen of the United States, residing at Philadelphia, in the county of Philadelphia and State of Pennsylvania, have invented certain new and useful Improvements in Resilient Wheels, of which the following is a specification, reference being had to the accompanying drawings.

This invention comprehends certain new and useful improvements in resilient tires, and it has for its primary object a simple, durable, and efficient construction of device of this character which will possess all of the advantageous characteristics of the pneumatic tire with its inflatable inner tube, without the accompanying disadvantages, in that the device of the present invention does not depend for its resilience upon the compression of the air within the shoe or casing and an inclosed inflatable inner tube, but upon an inner filling of cork or some similar substance or material, of novel formation, mounted within the casing and pressed outwardly against the inner wall thereof by novel and effective means hereinafter described, such means being adjustable inwardly and outwardly in a radial direction whereby the amount of tension on the outer or tread portion of the casing may be varied at will, this construction and arrangement of parts rendering the tire entirely incapable of being rendered defective by any puncture, and obviating entirely the possibility of any blow-outs, as there is only atmospheric pressure within the casing and no necessity of inflating the same.

A further object of the invention is a tire of this character wherein the filling is preferably formed of cork and of arched formation in cross section, whereby there will be an air space within the same, although of atmospheric pressure and not above the same, the inherent characteristics of this cork filler tending to instantly close any puncture, although it is to be understood that a puncture would not put the tire out of commission, for the reasons above stated.

A still further object of the invention is an improved resilient tire wherein the filler is pressed outwardly against the inner wall of the shoe or casing by means of a sectional band preferably formed of indurated fiber or some other similar impervious and relatively rigid substance, the sections of this band being pressed outwardly against the inner edges of the transversely arched filler by means of adjusting bolts or screws which may be tightened to the desired extent, according to the weight of the car and the desired resilience to be obtained, or in view of any other particular requirements or circumstances of the surrounding conditions in hand.

The invention has for a still further object improved means for holding the inner flanged edges of the outer shoe or casing in place, whereby all liability of accidental displacement or detachment will be effectually precluded. And the invention also aims to generally improve tires for automobiles or other vehicles, so as to render them more useful and commercially desirable.

With these and other objects in view, as will more fully appear as the description proceeds, the invention consists in certain construction, arrangement and combinations of the parts that I shall hereinafter fully describe and claim.

Figure 2:
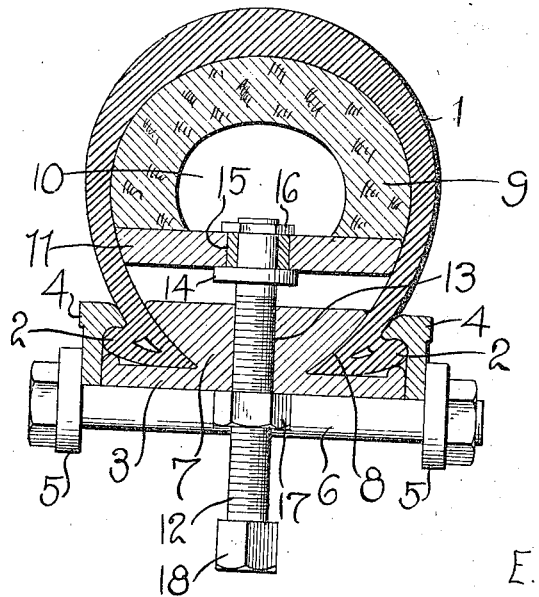

For a full understanding of the invention, reference is to be had to the following description and accompanying drawing, in which, Figure 1 is a side elevation of a portion of a wheel having therein a tire constructed in accordance with the principles and improvements of my invention. Fig. 2 is an enlarged transverse sectional view.

Corresponding and like parts are referred to in the following description and designated in all of the views of the accompanying drawing by like reference characters.

Referring to the drawing, the numeral 1 designates a shoe or casing which may be of any desired or conventional form or type such as are now commonly in use, said casing being formed at its inner ends with outstanding annular flanges 2 designed to rest upon the rim 3 and be retained thereon by means of the flanged rings 4 secured in place in the customary manner by clips 5 and transversely extending bolts 6 such as is customary with the rims of the demountable type, for it is to be understood that my invention is applicable for the rims now in use and does not require any changes therein or additions thereto. It is to be particularly noted, however, that my improved rim 3 is not open in the space between the inner ends 2 of the casing 1, but is formed at such point with an outwardly extending annular flange 7, the side walls of which are dovetailed or under-cut, as at 8. It will be noted that these under-cut side walls conform to and contact with the inner wall of the casing 1 at the inner ends 2 of the latter, whereby the flanged inner ends 2 are securely held in position, both as against inward and outward movement, and the shoe or casing is very securely held in place and the possibility of accidental displacement or detachment positively precluded. This feature alone is an important one and obviously can be used with the ordinary pneumatic tires with their inflatable tubes, as well as with the other improvements of my present invention.

Mounted within the casing 1 is a filler 9 which is preferably formed of cork or some other similar substance or material, and which is preferably continuous in a circumferential direction. Preferably, the filler 9 is of arched formation in cross section, as best illustrated in Fig. 2, being the segment of a circle, transversely considered, of somewhat more than 180 degrees. At this point it is believed to be well to call particular attention to the fact that the space 10 within this filler 9 contains air at atmospheric pressure and not above atmospheric.

Mounted within the circle of the filler 9 is a sectional band 11, preferably formed of indurated fiber or some other substantially impermeable and rigid substance or material, there being in the present instance, one of the sections of the band between every two of the spokes, although it is to be understood that any desired number and length of sections may be used within the purview of my invention.

The sections 11 are pressed outwardly, as required, against the inner edges of the filler 9 by means of tension bolts 12, which are mounted for a radial movement and of which, in the present instance, there are two for each section, being disposed near the ends of the section with the clips 5 and bolts 6 interposed between them. The bolts 12 are mounted for a threaded engagement in threaded openings 13 that are formed in the rim 3, and its fillet 7 and the outer ends of the bolts have swivel connection with the sections 11 at the middle thereof. In the present embodiment of the invention, the bolts 12 are formed near their outer ends with annular shoulders or collars 14 which bear against bushings 15 secured in the sections of the band, and a flat nut 16 is secured to the outer extremity of the bolts, whereby the bolts will be securely held in proper operative positions relative to the sections but will be permitted to turn freely therein, so that as the bolts are turned in a direction to move them outwardly, they will transmit movement to the sections of the band 11 and the latter will press firmly against the transversely arched filler 9 and the latter in turn against the shoe or casing 1 whereby the desired resilience will be secured, the same being confined to points extending from the extreme tread surface of the casing to the outer face of the band 11 and from that point inwardly the construction being substantially solid and unyielding, although adjustable, as required. Preferably jam nuts 17 are threaded on the bolts 12, whereby they may be locked when properly adjusted, and the inner ends of the bolts are provided with heads 18 which are squared or otherwise non-circular, so that a wrench or similar tool may be easily applied thereto for the purposes of adjustment.

From the foregoing description in connection with the accompanying drawing, the operation of my improved resilient tire will be apparent. In the practical use of the tire, it will be clearly understood that the bolts 12 are adjusted outwardly in a radial direction, whereby the sections of the ring 11 will be forced outwardly against the cork filler 9 and the latter in turn pressed outwardly as required, against the casing 1. Thus, all liability of blow-outs is positively precluded and all danger from punctures obviated, while at the same time the tire will possess resilience and give to the automobile or other vehicle, to the wheels of which tires of this construction are applied, easy riding qualities. Another very important advantage of this construction and arrangement of parts obviously resides in the fact that the shoe or casing can be worn down to practically nothing without detracting from the serviceability of the tire, as the air within the cork filler 9 is of atmospheric pressure, as above stated, and all possibility of blow-outs is precluded.

While the accompanying drawing illustrates what I believe to be the preferred embodiment of my invention, it is to be understood that the invention is not limited thereto, but that various changes may be made in the construction, arrangement and proportions of the parts without departing from the scope of the invention as defined in the appended claim.

What is claimed, is:

The combination with the rim of a wheel, a casing secured thereto, of a cork filler continuous in a circumferential direction mounted within the casing and of arched formation in cross section and being the segment of a circle in cross section of more than 180°, a sectional band mounted within the casing inwardly of the filler and adapted to press against the side edges of the filler, and means carried by the rim operatively engaged with each of the sections of the band for pressing the sections of the band outwardly in a radial direction against the filler.

In testimony whereof I hereunto affix my signature in the presence of two witnesses.

EÑAN M. DEAL.

Witnesses:
   JAMES BARR,
   D. GARRISON GLALLING.